US008123019B2

United States Patent
Johannsen

(10) Patent No.: US 8,123,019 B2
(45) Date of Patent: Feb. 28, 2012

(54) EXTENDABLE AND RETRACTABLE AUXILIARY AXLE FOR TRANSPORTABLE CONVEYOR SYSTEM

(75) Inventor: Thorkil J Johannsen, Norval (CA)

(73) Assignee: Thor Global Enterprises Ltd, Ontario (CA)

( * ) Notice: Subject to any disclaimer, the term of this patent is extended or adjusted under 35 U.S.C. 154(b) by 0 days.

(21) Appl. No.: 12/962,291

(22) Filed: Dec. 7, 2010

(65) Prior Publication Data

US 2011/0139576 A1 Jun. 16, 2011

(30) Foreign Application Priority Data

Dec. 15, 2009 (CA) .................................... 2688706

(51) Int. Cl.
*B65G 17/28* (2006.01)
(52) U.S. Cl. .................... 198/313; 198/315; 198/317
(58) Field of Classification Search .................. 198/312, 198/313, 315, 316.1, 317
See application file for complete search history.

(56) References Cited

U.S. PATENT DOCUMENTS

| 3,552,546 | A | * | 1/1971 | Rath | 198/313 |
|---|---|---|---|---|---|
| 3,746,150 | A | * | 7/1973 | Briggs | 198/316.1 |
| 3,945,484 | A | * | 3/1976 | Oury | 198/313 |
| 4,624,357 | A | * | 11/1986 | Oury et al. | 198/313 |
| 5,863,174 | A | * | 1/1999 | Mola | 198/312 |
| 6,283,269 | B1 | * | 9/2001 | Mayer | 198/313 |
| 6,805,229 | B2 | * | 10/2004 | Dekoning | 198/313 |

* cited by examiner

*Primary Examiner* — James R Bidwell
(74) *Attorney, Agent, or Firm* — The Farrell Law Firm, P.C.

(57) ABSTRACT

This invention provides an improvement relating to an extendable and retractable auxiliary axle suitable for supporting an end section of a telescopic conveyor system having rotatable wheel assemblies. The improvement provides for an axle assembly for a conveyor system where the axle is a transversely extending axle positioned forwardly of the rotatable wheel assemblies on the conveyor system. There is provided an axle frame operatively associated with the axle for mounting the axle relative to the conveyor system. Actuatable systems mounted on the frame are provided for displacing the axle between a first raised position and a second lowered position; also provided are a device for actuating the actuatable system to permit the actuatable system to raise and lower the auxiliary axle as desired.

9 Claims, 3 Drawing Sheets

EXTENDABLE AND RETRACTABLE AUXILIARY AXLE FOR TRANSPORTABLE CONVEYOR SYSTEM

BACKGROUND OF THE INVENTION

1. Field of the Invention

The present invention relates generally to transportable conveyor systems, and more particularly, to telescopic transportable conveyor systems.

2. Description of the Related Art

Conveyor systems such as telescopic conveyor systems are commonly used to transport materials from one location to another. There are several known examples of conveyor systems, particularly extendable or telescopic systems, as disclosed, for example, in Canadian patent 2,223,202, Thor Global Enterprises Ltd., issued Jun. 22, 2004, as well as e.g. U.S. Pat. No. 3,378,125 issued Apr. 16, 1968 to Fogg, U.S. Pat. No. 3,825,107 issued Jul. 23, 1974 to Cary et al., and U.S. Pat. No. 5,351,809 issued Oct. 4, 2994 to Gilmore et al.

Telescopic conveyor systems find application in different industries such as the aggregate industry where mobile conveyors are used to form stockpiles of aggregate materials. Depending on the type of industry, the telescopic conveyors will vary in size—for example, those used in the aggregate industry have generally large belts to permit movement of large volumes of aggregates.

Today, the length of the conveyor system is such that they can range from e.g. 40 feet to 80 feet or more for a single conveyor system; for telescopic versions, such conveyor systems are manufactured to have an extended length of e.g. 100 feet to 150 feet or more.

As disclosed in Canadian '202, telescopic conveyor systems utilize technology where one length of the conveyor system is positioned within a second length for transport purposes; when a first length is extended from the second length of conveyor system, the whole system is braced by suitable braces connected to a transport frame. For transport, conveyor systems are generally provided with transport wheels and towed or pulled by a truck or similar vehicle from e.g. a site of manufacture to an area of usage.

For telescopic conveyor systems, obviously the length of the sections of the conveyor system have to be minimized for road usage; normally, a set of two or more transport wheels are located on a base frame mounting the telescopic conveyor system.

When placed at the site of use, radial movement of the conveyor system is required and for this purpose, the prior art has proposed that the transport wheels be positioned laterally of the conveyor system (as opposed to the wheels being in transport position for highway use). When positioned for radial movement, the wheels of the conveyor system are supported by suitable framework extending from the conveyor system to hold the wheels in place and when radial movement is required, the conveyor may be readily rotated from a first to second position.

Problems arise when the conveyor system employs more than one set of transport wheels, possibly in combination with separate wheels, which would be mounted to the conveyor system to function solely as wheels permitting lateral or radial movement. To accomplish this, certain prior art arrangements have employed arrangements to deactivate the transport wheels and position the wheels permitting radial movement in an angular relationship to the conveyor system. The problem encountered in such arrangements is that the transport wheels have to be removed from contact with the substrate (e.g. ground) surface. Some complicated arrangements have been proposed to displace the transport wheels or alternatively, to make such wheels function as wheels for radial movement of the conveyor system.

SUMMARY OF THE INVENTION

Applicant has developed a new improved system whereby the transport wheels can be readily displaced from a conveyor transport mode to permit the separate displacement and positioning of wheels for radial movement of a conveyor system.

More particularly, according to one aspect of the present invention, there is provided an improvement in an extendable and retractable auxiliary axle suitable for supporting an end section of a telescopic conveyor system having rotatable wheel assemblies, the improvement being wherein the axle comprises a transversely extending axle positioned forwardly of said rotatable wheel assemblies on said conveyor system; an axle frame operatively associated with said axle for mounting said axle relative to said conveyor system; actuatable means mounted on said frame for displacing said axle and the wheels mounted thereon between a first raised position and a second lowered position, and means for actuating said actuatable means to permit said actuatable means to raise and lower said auxiliary axle as desired.

According to another preferred embodiment of the invention, there is provided an extendable and retractable axle (supra), wherein the telescopic conveyor system comprises a pair of opposed side frame members, each side frame member having associated therewith a retractable wheel assembly, and wherein each of said retractable wheel assemblies on either side of said fame members includes said transversely extending axle, said axle frame, said actuatable means and said means for actuating said actuatable means.

According to yet another preferred embodiment of the present invention, there is provide the extendable and retractable axle (supra) wherein said axle comprises a single axle extending transversely between said wheel assemblies, the extendable and retractable axle each end of said axle including said actuatable means.

A further preferred embodiment of the invention provides an extendable and retractable axle wherein said axle comprises a pair of extendable and retractable axles positioned in opposed relationship and transversely located at or near said wheel assemblies, the extendable and retractable axles each having separate actuatable means.

In another preferred embodiment of the invention, there is provided an extendable and retractable axle wherein said actuatable means comprises a pneumatic, hydraulic or mechanical means adapted to reciprocate between a first upper position whereby said rotatable wheel assemblies are displaced from contact with a substrate and a second lower position whereby said actuatable means permits said rotatable wheel assemblies to be in contact with a substrate.

In a further preferred embodiment of the present invention, there is provided the extendable and retractable axle (supra) wherein said means for actuating said actuatable means comprises control switch means to actuate said actuatable means.

In a further preferred embodiment of the invention, the extendable and retractable axle (supra) is provided with control switch means comprises manually actuatable switch means for actuating said actuatable means.

In yet a further preferred embodiment of the invention, the extendable and retractable auxiliary axle (supra) is mounted to a telescopic conveyor system forward of said end section of said conveyor system.

In another preferred embodiment of the invention, the extendable and retractable auxiliary axle (supra) is provided wherein said auxiliary axle is operatively mounted to a frame of said conveyor system on opposed sides thereof, said extendable and retractable axle including pneumatic shock absorbing means associated with said axle frame.

BRIEF DESCRIPTION OF THE DRAWINGS

Having thus generally described the invention, reference will now be made to the accompanying drawings in which.

DETAILED DESCRIPTION OF EMBODIMENTS OF THE PRESENT INVENTION

Figure 1:
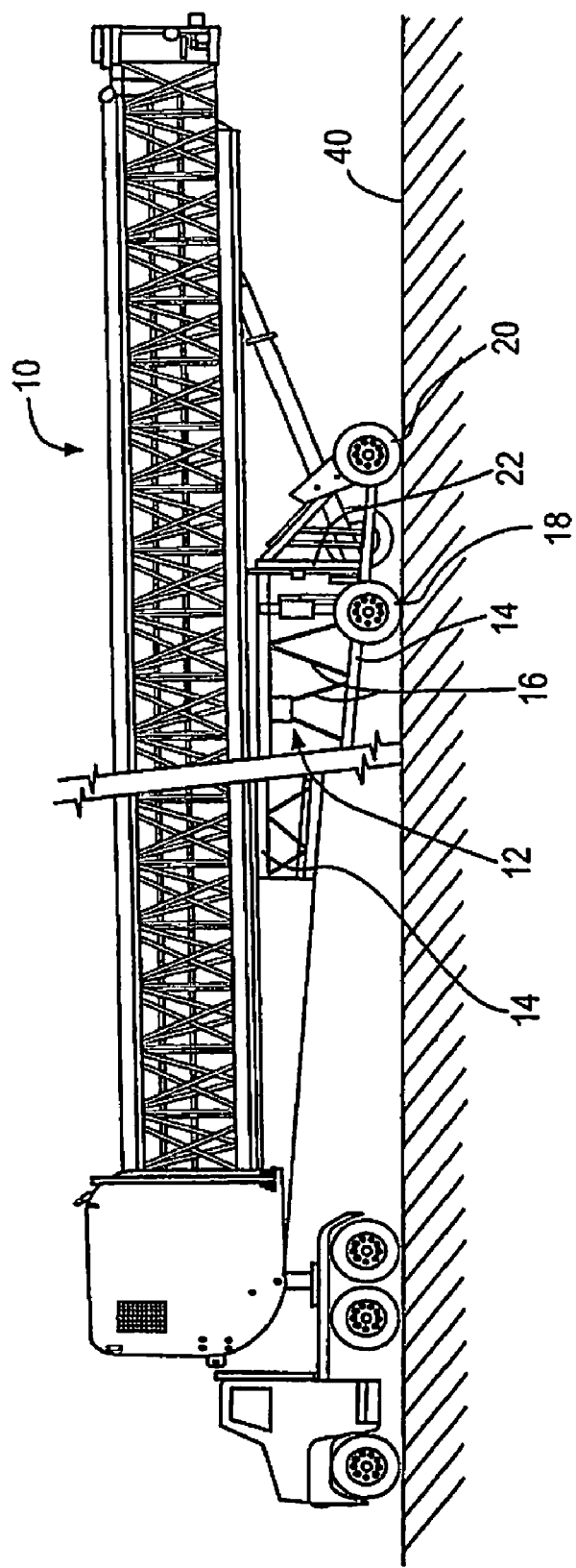
FIG. 1 is a side elevational view of a telescopically mounted conveyor system supported by a base frame.

The telescopic conveyor system shown in FIG. 1 is indicated generally by reference numeral 10 and the base frame indicated generally by reference numeral 12.

The telescopic conveyor system can be any typical system such as that disclosed in Canadian '202 (supra); likewise, the base frame of the telescopic conveyor system can comprise any suitable base frame which typically includes frame members 14 and a plurality of braces 16.

As seen from FIG. 1, there are two sets of wheels provided for transport of the conveyor system indicated generally by reference numerals 18 and 20. The drive wheels 20 are used for highway transport and are adapted, when the conveyor system is at a work site, to be turned outwardly and positioned radially relative to the conveyor system 10, to permit radial movement of the conveyor at a work site. Auxiliary wheels 18 are used primarily for transport of the conveyor system over a roadway; in a conventional arrangement, prior to the present invention, the auxiliary wheels 18 (see FIG. 1) would be positioned rearwardly of the end frame member or section 22 of the base frame belonging to the conveyor system.

With the present invention, Applicant's improvement resides in the fact that the auxiliary wheels 18, mounted on an auxiliary axle, are positioned in advance of the end of base frame member 22 and in this respect, reference will be made to FIGS. 2 through 5.

Figure 2:
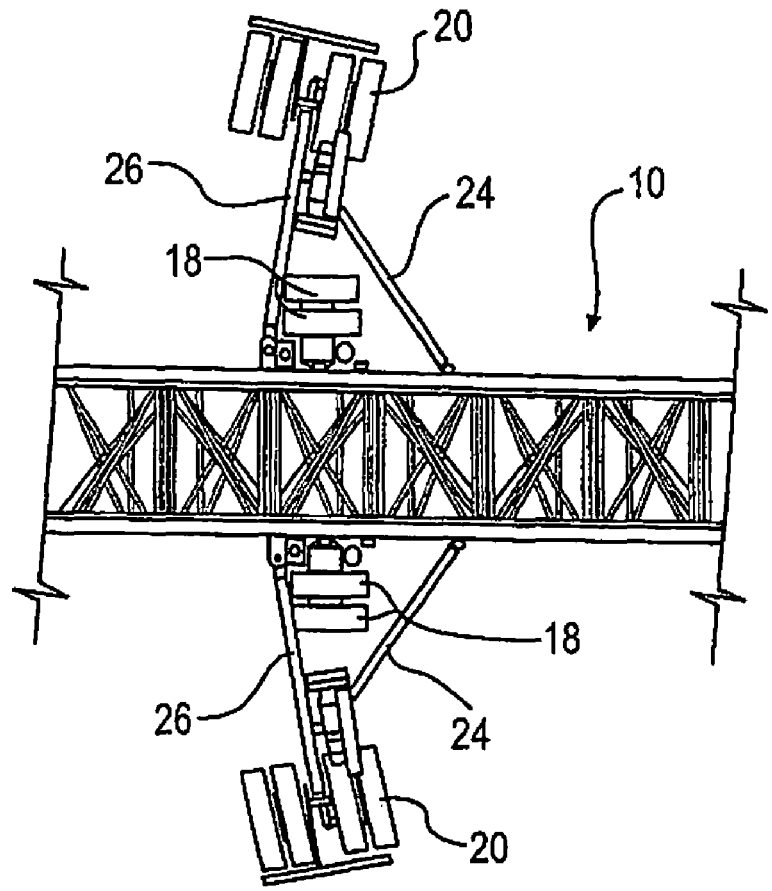
FIG. 2 is a top plan view of a portion of the conveyor showing the lateral wheels in an operating position and with the extendable and retractable axle arrangement shown in the transport mode.

Referring initially to FIG. 2, the wheels 20 are shown in a working position for radial or lateral movement of the overall conveyor system 10; these wheels, which are positioned laterally to the conveyor system 10, are supported and mounted by conventional technology utilizing e.g. support members 24 and 26. As will be seen from FIG. 2, a pair of transversely extending auxiliary wheels 18 are mounted on each side of the base frame 22, independently from the wheels 20.

Mounting of the auxiliary wheels 18 is accomplished using an axle member; the axle can be a single continuous axle extending transversely to the conveyor system or two individual axles, one on each side of the conveyor system. The mounting system also includes a support member indicated generally by reference numeral 28 which is attached at the upper end to a frame member F of the base frame by e.g. a plate member 30, and at the lower end, by a similar arrangement to frame member G of the base frame. The auxiliary wheel mounting arrangement can include a dampening means such as a pneumatic air bag 32 for suspension purposes; the air bag is not essential but desirable in most cases particularly for road travel.

Figure 3:
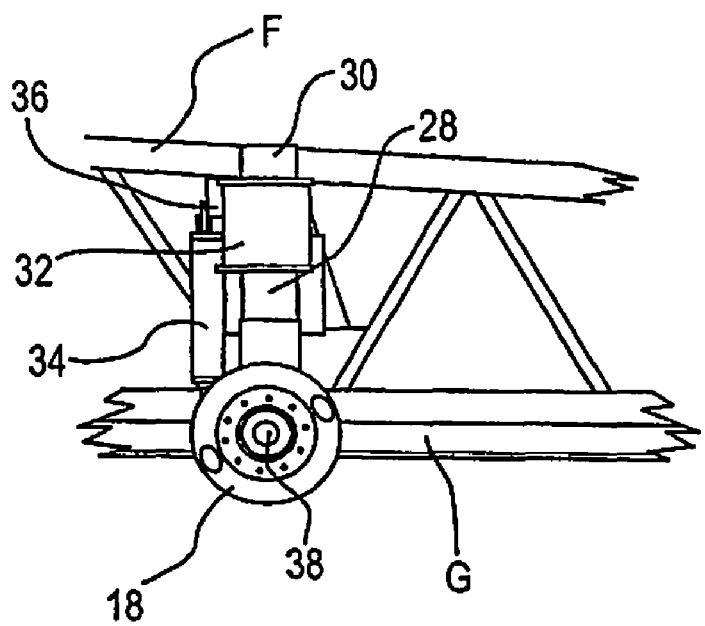
FIG. 3 is a partial side elevational view showing the components for raising and lowering the transport wheels.
Figure 4:
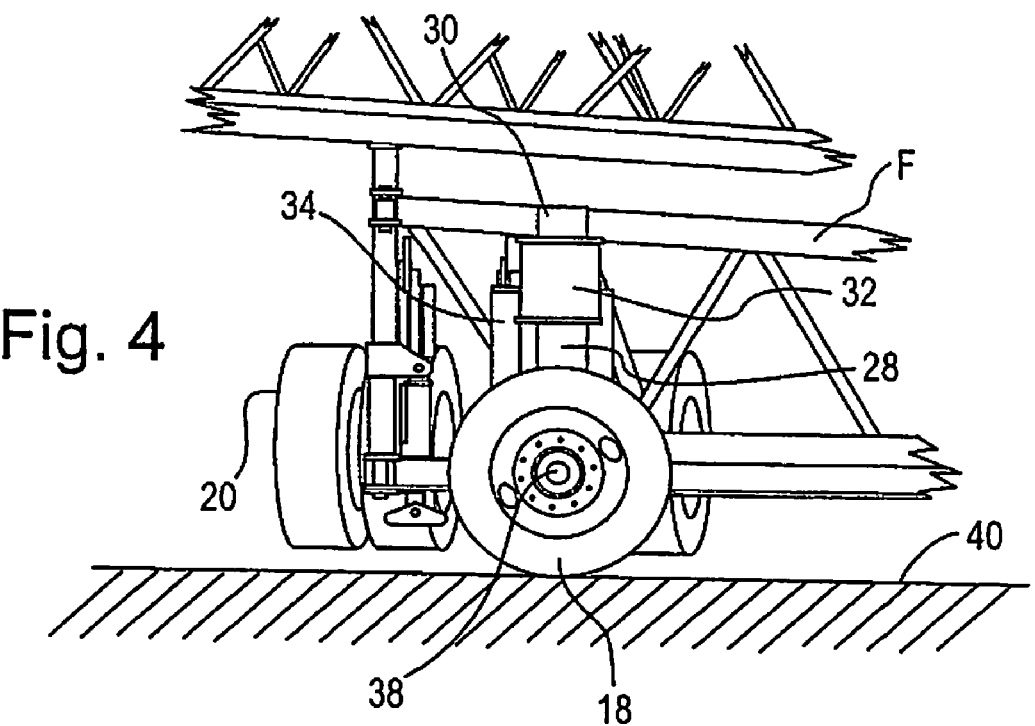
FIG. 4 is a partial rear elevational view showing the system of the present invention where the drive wheels are lowered.
Figure 5:
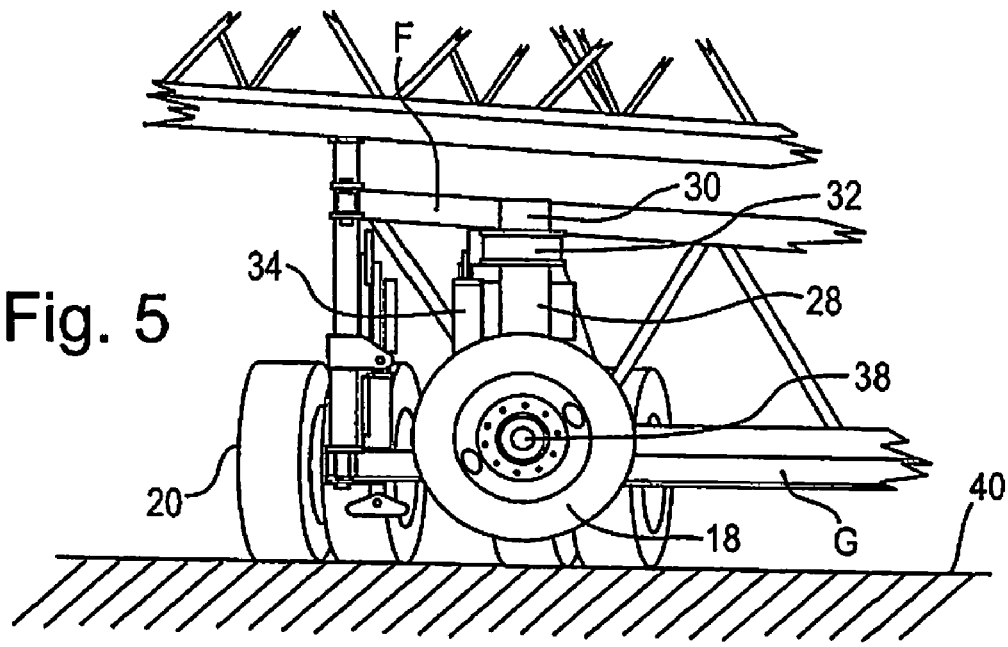
FIG. 5 is a view similar to FIG. 4 showing the drive wheels in a raised position.

As will be seen from FIGS. 3 through 5, a piston assembly 34 is provided and is connected at its upper end by a frame member 36 to the frame F; at its lower end, the piston assembly 34 is mounted directly or indirectly to an axle 38 which extends transversely to the conveyor assembly 10 which axle 38 mounts both sets of drive wheels 18 on either side of the conveyor system for road travel.

Actuation of the piston assembly 34 will result in the wheels 18 being raised to a non-substrate (e.g. a roadway indicated by reference numeral 40) engaging position whereby the wheels 20, when the conveyor is at a work site, may be operated to radially move the conveyor system. This is illustrated in FIG. 5. When the auxiliary wheels 18 are in a raised position, should an air bag be employed as described above, the air will be released from the bag. Conversely, when the auxiliary wheels and axle are lowered, the air bag 32 will be filled with air. When required, the auxiliary wheels 18 may be lowered for forward and reverse movement of the conveyor system as shown in FIG. 4. When the auxiliary wheels 18 are lowered, as illustrated in FIG. 4, the travel or drive wheels 20 of the conveyor assembly will be raised off the substrate, e.g. ground. This will permit movement of the overall conveyor system for positioning, as desired, at a location where the conveyor system is to be used. Suitable means (not shown) can be connected to the piston assembly 34 (e.g. switch means or the like) for effecting actuation of the piston assembly 34. Other suitable arrangements for effecting actuation of the piston assembly 34 include mechanical connections to actuate or de-actuate the assembly 34; these may be connected to suitable sources of fluid or pneumatic sources.

It should also be noted that for movement of the overall conveyor system on, e.g. a roadway, the piston assembly 34 will normally be disconnected for travel in order to avoid damage to the system.

It will be understood that various modifications can be made to the above-described embodiments without departing from the spirit and scope of the invention described herein.

What is claimed is:

1. In an extendable and retractable auxiliary axle suitable for supporting an end section of a telescopic conveyor system having rotatable wheel assemblies, the improvement wherein the axle comprises:
   a transversely extending axle positioned forwardly of said rotatable wheel assemblies on said conveyor system;
   an axle frame operatively associated with said axle for mounting said axle relative to said conveyor system;
   actuatable means mounted on said frame for displacing said axle between a first raised position and a second lowered position, and
   means for actuating said actuatable means to permit said actuatable means to raise and lower said auxiliary axle as desired.

2. The extendable and retractable axle of claim 1, wherein the telescopic conveyor system comprises a pair of opposed side frame members, each side frame member having associated therewith a retractable wheel assembly, and wherein each of said retractable wheel assemblies on either side of said frame members includes said transversely extending axle, said axle frame, said actuatable means and said means for actuating said actuatable means.

3. The extendable and retractable axle of claim 1, wherein said axle comprises a single axle extending transversely between said wheel assemblies, the extendable and retractable axle each end of said axle including said actuatable means.

4. The extendable and retractable axle of claim 1, wherein said axle comprises a pair of extendable and retractable axles positioned in opposed relationship and transversely located at or near said wheel assemblies, the extendable and retractable axles each having separate actuatable means.

5. The extendable and retractable axle of claim 1, wherein said actuatable means comprises a pneumatic, hydraulic or mechanical means adapted to reciprocate between a first upper position whereby said rotatable wheel assemblies are displaced from contact with a substrate and a second lower position whereby said actuatable means permits said rotatable wheel assemblies to be in contact with a substrate.

6. The extendable and retractable axle of claim 1, wherein said means for actuating said actuatable means comprises control switch means to actuate said actuatable means.

7. The extendable and retractable axle of claim 6, wherein said control switch means comprises manually actuatable switch means for actuating said actuatable means.

8. The extendable and retractable axle of claim 1, wherein said extendable and retractable auxiliary axle is mounted to a telescopic conveyor system forward of said end section of said conveyor system.

9. The extendable and retractable auxiliary axle of claim 1, wherein said auxiliary axle is operatively mounted to a frame of said conveyor system on opposed sides thereof, said extendable and retractable axle including pneumatic shock absorbing means associated with said axle frame.

* * * * *